Patented Jan. 7, 1941

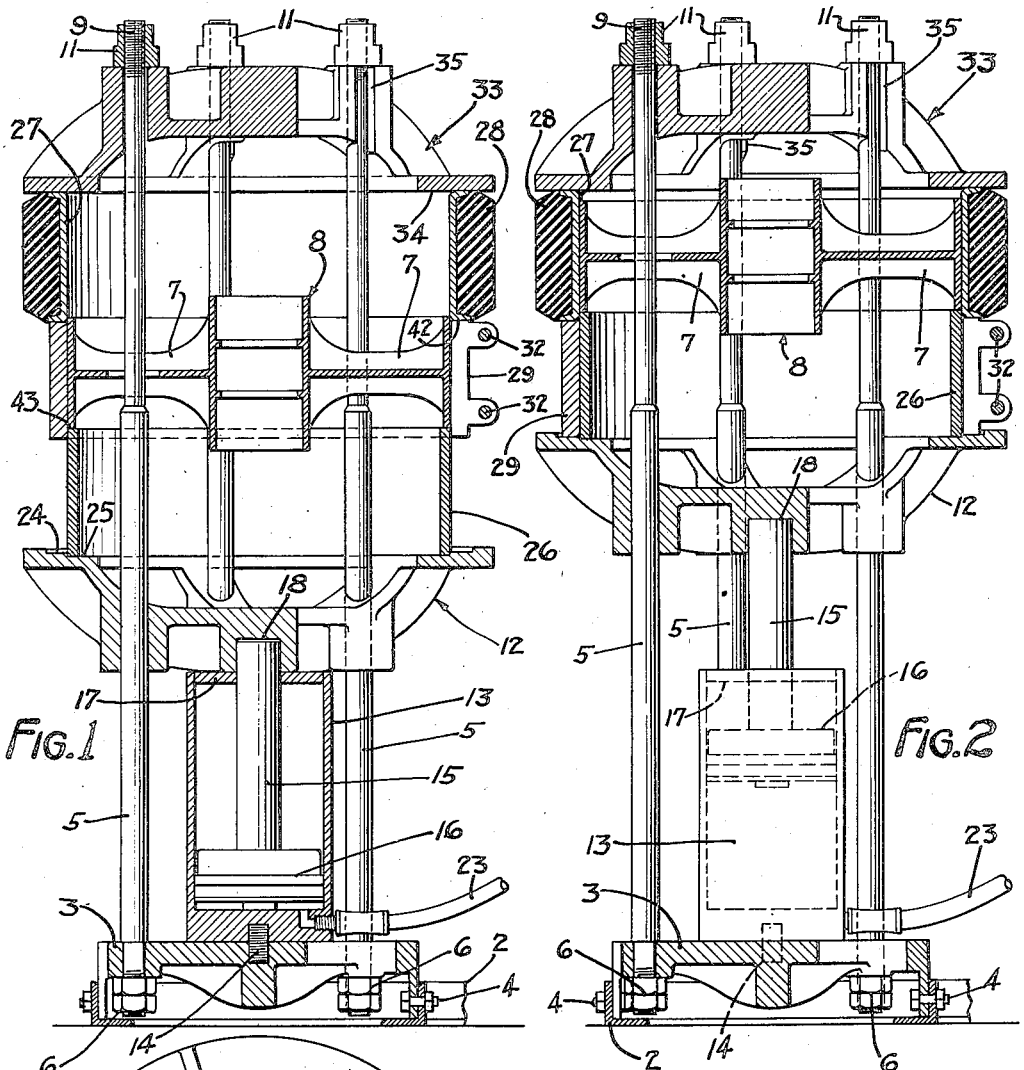

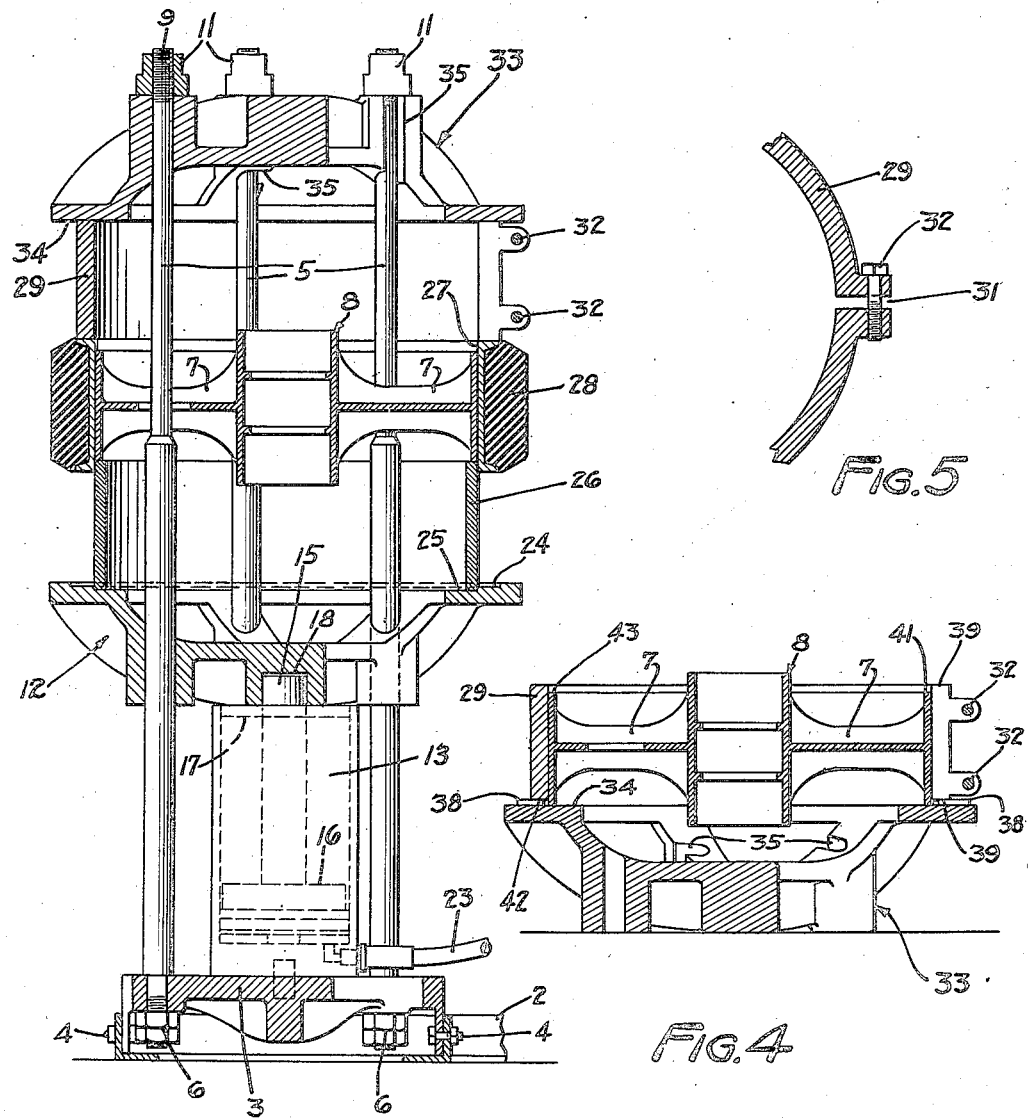

2,228,086

UNITED STATES PATENT OFFICE 2,228,086

WHEEL PRESS

James S. Rodgers, Minneapolis, Minn., assignor to Rodgers Hydraulic Incorporated, Minneapolis, Minn., a corporation of Minnesota Application May 11, 1939, Serial No. 272,999

2 Claims. (Cl. 157—6)

This invention relates to new and useful improvements in presses and more particularly to a hydraulic wheel press adapted to force a tire off or on to the rim of a wheel.

Wheels, such as commonly used on numerous commercial and army trucks, are usually constructed entirely of metal and have a rim turned to a predetermined diameter to receive the tire rim. The tire, as is well known, is provided with an annular metallic rim having outwardly turned flanges between which the usual rubber tire is mounted. The tire rim is bored to receive the rim of the wheel under pressure, whereby it is retained on the wheel by friction and without separable securing means. A tire rim of the pressure type, which is usually retained on the wheel by a press fit, is frequently very difficult to remove, after the wheel has been in use for a period of time, and may require considerable pressure to force it off the wheel. Because of the great pressure required to remove such tires, presses of the type now commonly employed, are extremely heavy and are therefore difficult to move about from place to place. The reason that conventional presses are made so large and heavy is primarily because the connection between the thrust member and the table or pressure member is spaced outwardly from the axis of these two members in order to permit clearance for inserting a wheel therebetween.

The novel press herein disclosed, because of its novel design, is considerably lighter in weight than conventional presses, in that the usual connections between the thrust member and the table or pressure member are located within the diameter of the wheel, and are in the form of steel rods which pass between the spokes of the wheel so that the pressure exerted against the thrust member by the wheel, when the pressure member is operated, is confined within the diameter of the wheel. By this novel construction, the entire apparatus may be made a great deal lighter in weight, whereby it may be portable so that it can readily be moved about from place to place. This is a very desirable feature, particularly in wheel presses, in that the press may readily be transported from place to place, whereby the work of changing tires may be done on the job, rather than having to transport the truck or truck wheels to a press located at a remote point, which may result in costly delays.

An object of the present invention, therefore, is to provide a portable press of the character disclosed, which is comparatively light in weight, whereby it may readily be moved about from one place to another on a truck or trailer.

A further object of the invention is to provide a wheel press comprising a suitable base having a plurality of rods secured thereto at one end and disposed in spaced relation, and upper and lower pressure members being mounted on said rods between which a wheel and tire may be supported in the operation of pressing the tire on or off the wheel, and suitable pressure means being provided for operating said members.

Other objects of the invention reside in the novel arrangement of the table and thrust member, and the tension rods connecting together these parts; in the spacing and arrangement of the rods, whereby they may readily be passed between the spokes of the wheel so that the force exerted on the pressure members and said rods will be uniformly distributed thereon, whereby the parts may be made considerably lighter in weight; in the provision of a pressure ring, the diameter of which is substantially equal to or slightly less than the diameter of the wheel, whereby it may pass through the rim of the tire, while in engagement with the wheel rim, in the operation of forcing the tire rim off the wheel; in the provision of a combination guide and thrust ring adapted to be clamped to the periphery of the wheel and which serves to guide the wheel accurately into the tire rim, and also as a gauge to accurately position the tire rim on the wheels; in the construction of the thrust member, whereby it may readily be attached to or detached from the tension rods to facilitate positioning the pressure ring and wheel upon the lower thrust member or table; in the means for accurately positioning the guide and thrust ring upon the wheel, whereby it will be slightly offset from the median plane of the wheel, thereby to provide at one side of the wheel, a seat for receiving the pressure ring and at its opposite side, a seat for receiving the tire rim whereby said parts will be axially alined, and whereby the wheel may be accurately guided into the tire; and, in the simple and compact construction of the apparatus, whereby it may be made extremely light in weight, as compared to other structures of this general character, and also whereby it may be manufactured at small cost, and also whereby it may readily be dismantled to facilitate loading it into or off a truck, when necessary.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a vertical sectional view of the press showing a wheel and tire positioned thereon, prior to pressing the wheel into the tire rim;

Figure 2 is a similar view showing the table or lower thrust member elevated to press the wheel into the tire rim;

Figure 3 is a plan view of Figure 1;

Figure 4 is a detail sectional view showing the table removed from the tension rods and a convenient manner of positioning the split guide and thrust ring upon the wheel;

Figure 5 is a detail sectional view of a portion of the guide ring;

Figure 6 is a view similar to Figure 1, with the parts positioned to force the wheel out of the tire rim;

Figure 7:
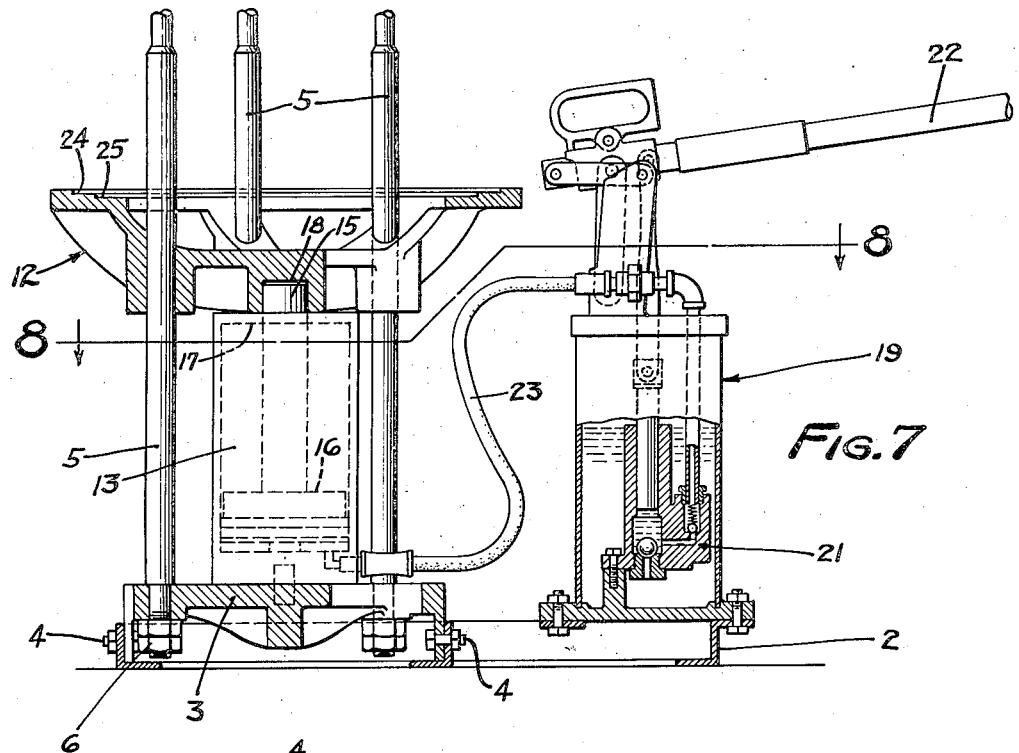
Figure 7 is a view showing a portion of the press and the means for actuating the ram.
Figure 8:
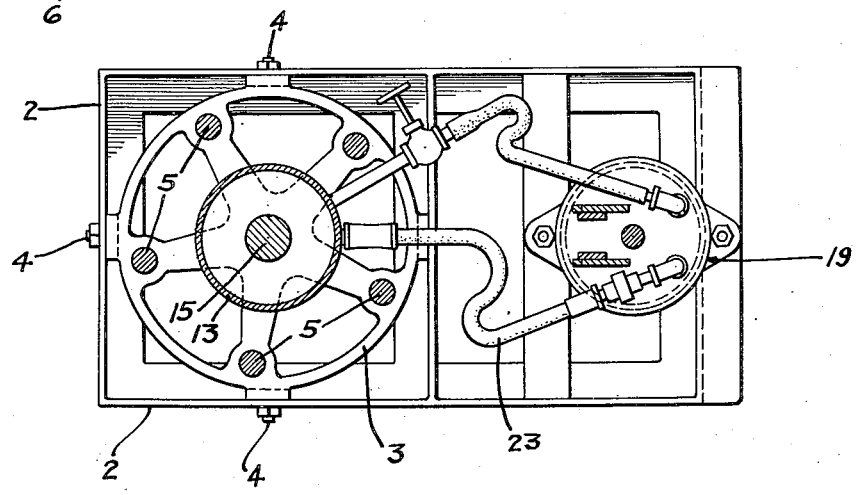
Figure 8 is a sectional plan view on the line 8—8 of Figure 7.

The novel press herein disclosed, is shown comprising a suitable base, generally indicated by the numeral 2, which may, for all practical purposes, be made of cast metal. An annular supporting member 3 is shown secured to one end of the base 2 by suitable bolts 4. The annular supporting member 3 provides a support for a plurality of tension rods 5, having their lower ends suitably secured therein, as shown at 6 in Figure 7. The tension rods 5 extend upwardly from the base 2 in spaced parallel relation, and are arranged to pass between the spokes 7 of the wheel, generally indicated by the numeral 8, in Figures 1 and 2. The upper portions of the rods 5 are preferably reduced in diameter, as shown in the drawings, and their terminals 9 are threaded to receive suitable nuts 11.

A feature of the present invention resides in the novel construction of the wheel and tire rim supporting means. The means provided for supporting the wheel and tire rim is shown comprising a suitable table or lower pressure member, generally indicated by the numeral 12, which is mounted for sliding movement on the lower portions of the rods 5. When the apparatus is inoperative, the lower supporting member or table 12 may be supported upon the upper end of a cylinder 13, mounted on the supporting member 3, as best shown in Figure 1. A threaded stud 14 may be provided to retain the cylinder in position upon the supporting member 3.

The cylinder 13 has a ram 15 mounted therein, to the lower end of which is secured a piston 16. The upper end of the ram projects through the top wall 17 of the cylinder and is shown received in a socket 18 provided in the bottom of the table 12, as shown in Figures 1 and 2.

Means is provided for introducing fluid pressure into the cylinder below the piston 16, and is here shown comprising a suitable pump, generally indicated by the numeral 19. This pump is shown and described in detail in my Patent No. 2,092,738, and is provided with a suitable pumping mechanism 21 adapted to be actuated by an operating handle 22, whereby the fluid in the pump 19 is forced into the cylinder 13 below the piston 16, thereby to raise the ram to elevate the table 12, as will readily be understood. The pump 19 may be connected to the cylinder 15 by a flexible conduit 23. The pump is preferably mounted on one end of the base 2, as shown in Figure 7.

As best shown in Figures 1, 2, and 7, the upper surface of the table 12 may be provided with a plurality of annular recesses 24 and 25, corresponding to different wheel diameters. A pressure ring 26 is adapted to be seated in one of the recesses of the table 12, and in Figures 1 and 2, is shown seated in the smaller recess 25. The diameter of the thrust ring 26 is substantially equal to or slightly less than the outside diameter of the wheel 8, so that it may be extended partially into the tire rim 27, as shown in Figure 1, thereby to axially aline the tire rim 27 with the rim of the wheel.

A clamping ring 29 which preferably is split, as shown at 31 in Figure 5, is adapted to be fitted onto the wheel, as shown in Figures 1 and 2. The ring 29 is frictionally secured to the wheel rim by tightening the clamping screws 32 of the ring.

Another feature of the invention resides in the construction of the upper thrust member, generally indicated by the numeral 33, which is adapted to be engaged with the upper ends of the tension rods 5, as shown in Figures 1, 2, and 6. The thrust member 33 has a finished lower surface 34, which is disposed in parallel relation to the upper face of the lower thrust member 12. The member 33 is adapted to be engaged by the rim of the tire, as shown in Figures 1 and 2, or by the guide ring 29, as shown in Figure 6, in the operation of mounting the tire on the wheel or removing it therefrom. To facilitate mounting the wheel on the pressure ring 26 supported on the table 12, as shown in Figure 1, the thrust member 33 is so constructed that it may readily be removed from the upper end of the tension rods by partially rotating it in one direction to disengage it from the rods 5 and nuts 11. To thus facilitate removing the thrust member from the rods, recessed guides 35 are provided in the arms 37 of the member 33 for receiving the rods 5. The guides 35 are open at one side, as clearly illustrated in Figure 3. The spaces 36 between the spokes 37 of the thrust member 33 are sufficiently large to permit the nuts 11 on the rods 5 to readily pass therebetween, when the thrust member is partially rotated to disengage the guides 35 from the rods 5. It will thus be seen that for ordinary use, or at least, when operating on wheels of a given size, it is not necessary to remove the nuts from the rods or tighten them against the thrust member. The nuts 11 are of course, so positioned on the rods 5, that their lower faces will be disposed in a given plane, whereby the thrust exerted against the nuts will be uniformly distributed on the rods 5.

In the operation of removing a tire from the wheel, the wheel with the tire mounted thereon is positioned upon the pressure ring 26, as shown in Figure 6. The tire rim is usually slightly wider than the periphery of the wheel whereby it projects slightly beyond the side edges of the wheel rim, as shown in Figure 6. This slight projection of the rim beyond the edge of the wheel rim, provides a seat and guide for the upper end of the pressure ring 26, so that the wheel is not likely to become disarranged on the thrust ring, when pressed thereon.

After the wheel has been placed upon the pressure ring, as shown in Figure 6, the guide ring 29 is placed upon the upper end of the tire rim, after which the thrust member 33 is seated on the guide ring 29 and moved into locking engagement with the upper ends of the rods by a slight rotary movement thereof, as will be understood with reference to Figure 3. The bore of the guide ring 29 may be varied by manipulation of the clamping screws 32, so that the wheel may readily enter the guide ring, when the ram 15 is operated.

When the parts have been positioned as shown in Figure 6, the pump 19 is operated, whereupon the ram is thrust upwardly against the table 12 by the delivery of fluid into the cylinder beneath the piston 16. Continued movement of the ram will elevate the lower thrust member or table 12 and thus force the wheel out of the tire rim and into the guide ring 29, as will readily be understood by reference to Figure 6. The opposite edges of the guide ring 29 are disposed in parallel relation and the same applies to the opposite edges of the pressure ring 26, whereby the wheel cannot bind, as a result of uneven pressure applied thereto by the pressure ring 26, when the table is elevated.

When the wheel has been pressed out of the tire rim and into the guide ring 29, the ram may be lowered to its normal position, as shown in Figures 1 and 6, after which the upper thrust member 33 may readily be disengaged from the upper ends of the tension rods to permit convenient removal from the apparatus, of the wheel and guide ring, and also the tire.

In the operation of pressing the wheel into the rim, the guide ring 29 is first clamped onto the wheel, as shown in Figure 4. To facilitate mounting the guide ring on the wheel, the thrust member 33 may be utilized, and is preferably placed in an inverted position on the floor, as shown in Figure 4. The wheel is then placed on the upper finished surface 34 of the thrust member, after which the guide ring is fitted onto the wheel. To accurately position the guide ring 29 upon the wheel, suitable spacing elements 38 may be inserted between the lower edge of the guide ring 29 and the top surface 34 of the thrust member 33, whereby the edges 39 of the guide ring will be disposed in parallel relation to the adjacent edges 41 of the wheel. The clamping screws 32 are then tightened to frictionally secure the guide ring 29 to the periphery of the wheel. If desired, the spacing elements 38 may be inseparably attached to the guide ring 29 by suitable means, such as chain elements, not shown.

By reference to Figure 4, it will be noted that the guide ring 29 is slightly offset from the median plane of the wheel. The purpose of thus offsetting the guide ring on the wheel is to provide an annular seat 42 at one side of the wheel for receiving the rim of the tire, and at the same time, an annular seat 43 is provided at the opposite side of the wheel for receiving one edge of the pressure ring 26, as shown in Figure 1. The guide ring 29 is secured to the periphery of the wheel in such a manner that frictional contact between the periphery of the wheel and the bore of the guide ring will cause the opposite edges of the periphery of the wheel to be maintained in parallel relation with respect to the tire rim 27, whereby it will accurately enter the bore of the tire rim, as the ram is operated. The guide ring 29 also prevents the wheel from becoming misalined with the tire rim, in the operation of pressing the wheel into the rim, which is essential because of the greater pressure usually required to press the wheel into the tire rim.

When the wheel with the guide ring secured thereto, as shown in Figure 4, is removed from the thrust member 33 and placed on the pressure ring 26, as shown in Figure 1, it is inverted from the position shown in Figure 4, whereby the lower edge or seat 43 provided by offsetting the guide ring upon the wheel, will engage the upper edge of the pressure ring 26. When the wheel is thus positioned, the upper end of the wheel will project above the upper edge of the guide ring, and partially into the tire rim, thereby serving as a means for centering the rim upon the wheel, whereby the wheel will accurately enter the rim in the initial operation of pressing the wheel into the rim.

The guide ring 29 also serves as a limit stop for preventing the wheel from being pressed too far into the rim, as will readily be understood by reference to Figure 2. In this figure, it will be noted that the top surface of the lower thrust member or table 12 is engaged with the lower edge of the guide ring 29, whereby further upward movement of the table 12 is interrupted because of the guide ring and tire rim being abuttingly engaged with one another between the table 12 and thrust member 33. When the table 12 reaches the position shown in Figure 2, the median plane of the wheel will coincide with the median plane of the tire, whereby the tire is properly positioned upon the wheel. The ram may then be lowered and the thrust member 33 removed from the tension rods, as hereinbefore described, after which the wheel, with the tire mounted thereon, may conveniently be removed from the apparatus.

By passing the tension rods 5 between the spokes of the wheel, as shown in the drawings, the weight of the entire apparatus may be greatly reduced, because of the forces being transmitted through the wheel and not around the periphery thereof, as is customary in conventional presses.

It will also be noted that if the apparatus, in its assembled form, is found too heavy to conveniently transport from one place to another, it may readily be dis-assembled by simply removing the nuts 11 from the upper ends of the tension rods, after which the thrust member 33 and table 12 may readily be removed from the tension rods.

In some cases it may also be found desirable to remove the rods 5 from the base 3, in which case the nuts 11 need not be detached from the rods. When the rods are thus removed from the base, the base and cylinder assembly is materially lightened in weight, and may be more readily handled.

By the employment of the novel wheel press herein disclosed, the operation of removing a tire from a wheel, or mounting it thereon, is greatly facilitated and expedited. Because of the uniform distribution of the forces transmitted from the ram through the wheel against the thrust member 33, there is no danger of the parts becoming misalined to cause damage to the wheel or tire rim. It will also be noted, by the unique mounting of the cylinder upon the supporting member 3, that the forces imparted to the apparatus, when the ram is operated, are not transmitted to the base 2, as the rods are supported entirely in the supporting member 3, and as the cylinder 13 is also mounted upon this member, the forces are transmitted to the base 3, rods 5, and the parts mounted on the rods, and not to the base 2. The apparatus is extremely simple and inexpensive in construction whereby it may readily be manufactured in quantity production, at small cost.

I claim as my invention:

1. In a portable press of the class described, a base having a plurality of rods secured thereto and spaced equidistant apart in circular formation and adapted to pass between the spokes of a wheel, a lower thrust member slidable on the rods, an upper thrust member removably engaged with said rods, an annular member adapted to engage one of said thrust members and the tire rim, means on the other of said thrust members adapted to engage the wheel rim, and means for imparting relative axial movement to said thrust members in opposite directions, whereby the tire rim is forced off the wheel, the connection between the rods and said thrust members causing the force exerted thereon to be uniformly distributed around the circumference of the wheel.

2. A portable wheel press comprising a plurality of rods mounted in fixed relation, thrust members mounted on said rods adapted to receive a wheel therebetween, a guide member adapted to be frictionally fitted to the rim of the wheel in offset relation thereto, whereby one edge of the wheel rim projects beyond the adjacent edge of said guide member, thereby to provide an annular seat for receiving an edge of the tire rim, the opposite edge of said guide member projecting beyond the adjacent edge of the wheel rim, thereby to provide an annular seat, a pressure ring adapted to be seated on one of the thrust members and having its opposite edge received in said last mentioned annular seat, means for forcing the thrust members towards one another, whereby the wheel is forced out of said guide member and into the tire rim, and means whereby the frictional engagement of said guide member with the wheel rim may be controlled so as to maintain the tire rim and wheel rim in true axial alinement while forcing said tire and wheel rims into operative relation.

JAMES S. RODGERS.